United States Patent [19]

Suzuki et al.

[11] Patent Number: 4,802,169

[45] Date of Patent: Jan. 31, 1989

[54] METHOD OF AND DEVICE FOR STORING AND READING DIGITAL INFORMATION AT OPTION PROTECTED OR NOT BY AN ERROR CORRECTING CODE

[75] Inventors: Tadao Suzuki, Tokyo, Japan; Balthasar A. G. Van Luyt, Eindhoven; Lambertus M. C. Van Den Hoven, Best, both of Netherlands

[73] Assignee: Sony Corporation, Tokyo, Japan

[21] Appl. No.: 18,163

[22] Filed: Feb. 24, 1987

[30] Foreign Application Priority Data

Feb. 24, 1986 [NL] Netherlands ............ 8600450

[51] Int. Cl.⁴ ............................. G06F 11/10
[52] U.S. Cl. ........................................... 371/38
[58] Field of Search .................. 371/37, 38, 39, 40

[56] References Cited

U.S. PATENT DOCUMENTS

| | | | |
|---|---|---|---|
| 4,308,557 | 12/1981 | Dieterich | 371/38 X |
| 4,534,031 | 8/1985 | Jewer | 371/38 |
| 4,541,093 | 9/1985 | Furuya et al. | 371/40 |
| 4,564,945 | 1/1986 | Glover et al. | 371/38 |
| 4,633,471 | 12/1986 | Perera et al. | 371/38 |
| 4,644,544 | 2/1987 | Furuya et al. | 371/37 |
| 4,680,764 | 7/1987 | Suzuki et al. | 371/40 |

Primary Examiner—Charles E. Atkinson
Attorney, Agent, or Firm—Lewis H. Eslinger; Jay H. Maioli

[57] ABSTRACT

A method and apparatus for storing and reading digital information, in which the recorded information is protected by a double symbol correcting code involving interleaving between the codes and also employing an additional, optional error correcting code. The information is organized in sectors, which are arranged such that following the synchronization and header information sub-header information is provided to indicate different sub-modes of operation of the playback apparatus. During playback, when a first sub-mode indication value is detected, this means the sector contains further error protection information, that is, the optional error correcting code, for which purpose a special decoder is activated. When the sub-mode detector detects a second sub-mode indication value, this means that further user information is present at the location where the optional error protection information would have been, and the special decoder is not activated.

11 Claims, 2 Drawing Sheets

METHOD OF AND DEVICE FOR STORING AND READING DIGITAL INFORMATION AT OPTION PROTECTED OR NOT BY AN ERROR CORRECTING CODE

BACKGROUND OF THE INVENTION

1. Field of the Invention

The invention relates generally to a method of storing digital information and, more particularly, to arranging information for use in controlling operational modes of the playback apparatus.

2. Description of the Background

There has been proposed a method of arranging digital information on a record medium generally involving the steps of forming the data into user symbols, distributing the user symbols over a number of successive sectors, and with each sector being provided at its beginning with synchronization symbols and header symbols. Each sector is provided with first redundancy symbols of a first symbol correcting code. The symbols of a sector are distributed over a number of first frames, each of which contains a first, fixed number of symbols. Then, second redundancy symbols of a second symbol correcting code are added to a first frame and the symbols originating from a sector are interleaved with second redundancy symbols of a first frame over a number of second frames. Third redundancy symbols of a third symbol correcting code are added to a second frame, then the symbols originating from the first frame and third redundancy symbols are bit-serially made available for storage.

A method of this kind is described in allowed U.S. patent application Ser. No. 06/714,892, filed Mar. 22, 1985, now U.S. Pat. No. 4,680,764 issued 7/14/87, and assigned to the assignee thereof, which application is incorporated herein by reference, and the method is based on the frame format that is now customarily used for the so-called "Compact Disc" system for high-quality storage of audio information. One principal advantage is that it permits a high degree of error correction. One advantage of error correction involving interleaving techniques is that the data of the frames can be subjected to error correction upon arrival, so that the relevant data processor always has a uniform work load; moreover, a comparatively small buffer capacity is required. Consequently, such system is particularly suitable for real-time applications at comparatively low costs.

According to the above-identified patent application, the known compact audio disc format can be adapted for use when other data information, for example computer software, is to be stored, however, for such applications certain masking or concealing processes or permissible non-correctable errors, which can be used for audio information, become useless. One reason for this is the lack of correlation in this nonaudio data. In these other applications adequate protection must be achieved by providing an additional level of error protection, such as a symbol correcting code mentioned above. This protection is organized sector-wise, because for such data information the real-time principle at the frame level will usually be less important and, in any event, additional storage capacity (RAM) will typically be present. In such circumstances, the Compact Disc format will still be used, because the relevant encoders/decoders are manufactured in such large numbers that they are relatively inexpensive.

OBJECTS AND SUMMARY OF THE INVENTION

The present invention is based upon recognition of the fact that the above-described information storage system will find different fields of application. Some of these fields of application will necessitate the storage of audio and/or video information, in addition to the computer software, for example, as an illustration accompanying a text, examples of pronunciation in a dictionary, and the like. In the case of this latter example, additional error protection will not be particularly necessary, and the inherent additional redundancy needed for such error protection will be a drawback because the amount of user information will have been reduced accordingly.

Thus, it is an object of the invention to enable real-time format switching or changing-over at the sector level between, on the one hand, the situation in which the additional error protection is present and, on the other hand, the situation in which the storage space typically provided for this additional error protection is occupied by additional user information. Of course, the invention also ensures that the real-time format switching takes place in a highly reliable manner.

These objects in accordance with the invention are achieved by inserting between the header symbols and the user symbols in each sector a number of so-called sub-header symbols, which act as data symbols for a systematic, symbol correcting code, by a first sub-mode indication value indicating that the systematic, symbol correcting code is active, and a second sub-mode indication value in another similarly constructed sector indicating that the symbol correcting code is not active and that at least a part of the space of those first correction code symbols is occupied instead by further user symbols.

The invention utilizes the fact that in accordance with the format described in the above-identified patent application, some spare space is reserved in the sector format, however, this spare space is located after the data in the additional error protection area, so that decoding would necessarily have to be performed before that spare space would be useful. This decoding would be a time-consuming operation, because such decoding can start only after the entire amount of information of the sector has been received, and this would adversely affect the real-time format switching object of the present invention. Nevertheless, because this particular error correcting code is systematic or redundant, the relevant symbols will already be present in the sector, even if the redundancy is not used, but, of course, those symbols will be unprotected in the absence of this additional systematic (redundant) code. By utilizing repetition, the chance that at least one correct sub-mode indication value will be received correctly is comparatively high, and the selection between two different sub-mode indication values can be performed by way of a reliability indication received from the preceding decoding step. By inserting the sub-header symbols directly behind the header information in the sector, this sub-header information will be available at the start of reception of a sector, so that it can be received by the decoding apparatus as an indication of whether an error protection operation should be performed or not. Adequate protection is achieved by the repetition of the sub-mode indication and also by the fact that the information is still spread out along the track of the record medium due to interleaving.

In accordance with an aspect of present invention a method of reading digital information that has been recorded as above can include the following steps:

bit-serially receiving code symbols from a storage medium and forming third redundancy symbols and other symbols therefrom;

restoring the other symbols of a second frame by way of the third redundancy symbols thereof;

de-interleaving symbols of a second frame that have been restored over as many first frames, each of which contains second redundancy symbols and other symbols;

restoring the other symbols of a first frame by way of the second redundancy symbols thereof; and collecting the last-mentioned other symbols so as to form a sector, while therein defining at the same time successive synchronization symbols, header symbols and user symbols. The inventive method of reading digital information is then characterized in that behind the header symbols there are defined a number of sub-header symbols which act as data symbols for the first, systematic, symbol correcting code, and a first sub-mode indication value indicating that the first symbol correcting code is active, after which the user symbols are restored in the sector by way of the first redundancy symbols. In the absence of detection of the said first sub-mode symbols the detection is undertaken again, that is, detection is repeated to look for the first sub-mode symbol, however, in the case of repeated negative first sub-mode detection results a second sub-mode indication value is detected that indicates that the space of the first redundancy symbols is occupied instead by further user symbols and that the symbol restoration provided by the systematic symbol correction code is omitted. Upon decoding the second symbol correcting code, a signal is supplied which validates or rejects the reliability of a symbol. When the sub-mode indication occurs repeatedly in the sub-header symbols, any unreliability thereof may be symbolized by this reliability signal, which may be termed an unreliable data (URD) signal. In that case, the sub-mode indication of one of the repetitive sectors is selected; this provides adequate reliability.

The invention also relates to reading apparatus for performing a method as described above, and such apparatus is particularly suitable for interactive consumer systems (Home Interactive Systems).

The above and other objects, features, and advantages of the present invention will become apparent from the following detailed description of illustrative embodiments thereof to be read in conjunction with the accompanying drawings.

DETAILED DESCRIPTION OF PREFERRED EMBODIMENTS

Figure 1:
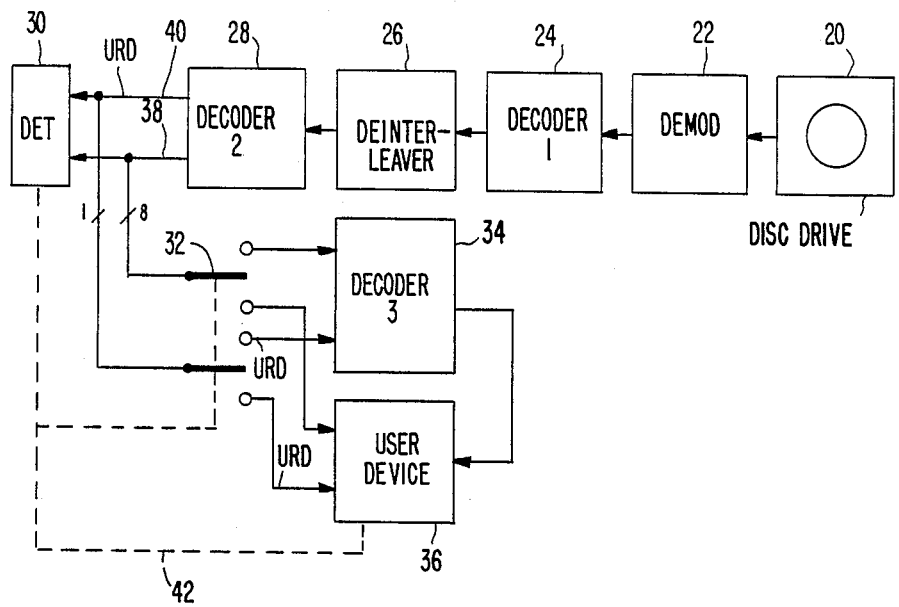
FIG. 1 is a schematic in a block diagram form of apparatus in accordance with the present invention.

FIG. 1 is a block diagram of apparatus in accordance with the present invention, in which the storage medium may be a disc having a diameter of 12 cm on which digital information is stored in the form of optically readable pits, as used, for example, in the compact audio disc technique. The disc drive or turntable with motor, servo system, centering system, laser system, and tracking system, are shown only generally at 20, because the present invention does not relate to the specific operation of these elements. This playback device 20 produces so-called channel bits fed to a demodulator 22, wherein a series of seventeen successive channel bits, including spacing bits, are converted into an 8-bit code symbol. In a first decoder 24 a frame consisting of thirty-two of these 8-bit code symbols is formed by descrambling in the well-known fashion and using the redundancy symbols contained therein, this frame is decoded so that twenty-eight code symbols remain. During this decoding operation one or more symbols may or may not be corrected. For the sake of brevity, this decoding operation will not be elaborated upon herein, however, it is noted that the code can advantageously be a Reed-Solomon code, although the symbol correcting codes can also be used. A de-interleaving element 26 de-interleaves the twenty-eight code symbols over as many frames, with each still containing the twenty-eight symbols. In a second decoder 28 the frame is further decoded by way of four redundancy symbols contained therein, so that twenty-four code symbols remain. During this decoding operation in second decoder 28, one or more symbols again may or may not be corrected. Because this operation is well-known and forms no part of the present invention, this decoding operation also will not described. Decoder 28 has nine parallel output lines and operates to place the decoded symbols on eight parallel lines 38, in the form of 8 bits in parallel, and to replace a reliability bit on line 40. The reliability bit is denoted URD, standing for unreliable data. When this URD bit has the value "1", the relevant symbol is probably unreliable, and this probability is co-determined by the decoding algorithm that is used. When the reliability bit (URD) has the value "0", the relevant symbol is assumed, in the first instance, to be reliable. In an alternate embodiment, the signals on lines 38 and 40 could be combined into a single line, on which the bits appear serially.

The symbols output from decoder element 28 are organized in the form of sectors, the format of which will be described hereinafter. To achieve this symbol organization, second decoder 28 may further include a device for reconstructing the sequence of the symbols, as described in the above-identified patent application. Descrambling, de-interleaving, and reconstruction can, in many cases, be advantageously performed by means of a random access memory (RAM), in which a large number of delay lines or first-in first-out lines having different delay times/lengths are implemented. Such systems are well-known, so the relevant equipment is not shown in the interest of brevity. Demodulator 22, decoders 24, 28 and de-interleaves 26 have been described generally in functional terms, however, at the hardware level the organization is mainly centered on a bus that cooperates with an arithmetic logic unit (ALU), a memory, and input/output (I/O) sub-systems.

A sector contains first synchronization information, followed by header information, possibly sub-header information according to the invention, and finally the information of interest, that is, the data.

Detector 30 is activated by the synchronization information contained in the output of decoder 28, and this is possible because, in principle at least, information that is the same as the content of the synchronization information does not occur elsewhere in the data stream. After recognition of the synchronization information, a symbol counter (not shown) in detector 30 is activated and begins counting down the symbols received. Thus, because it is known according to the invention that the synchronization information is succeeded by the header information and the header information is succeeded by the sub-header information, when the sub-header information is reached, detector 30 is activated. Typically, the sub-header information consists of eight bytes, and a part thereof, for example, the first byte, contains a first version of the sub-mode indication. A first content of the sub-mode indication indicates that the further part of the sector contains user symbols, which are protected by a further symbol correcting code, as described in the above-identified patent application, according to a somewhat different code format as will be explained hereinafter. When the first content of the sub-mode indication is detected and the URD information on line 40 for the relevant byte (bytes) indicates "reliable", an output signal on line 42 is generated by detector 30 that sets switches 32 to the upper position, so that the information, including the sub-mode indication, is applied to another decoder 34. It will be apparent that in a bus-oriented organization the foregoing is realized by way of an appropriate address sequence for the bus accesses.

When the URD information on line 40 indicates "unreliable", nothing will happen, that is, decoder 34 will not be activated. The relevant sub-header symbols, however, will not be lost because they may be needed at a later instant for determining the syndrome symbols during the error correction. A second content of the sub-mode indication indicates that the further part of the sector is not protected by the symbol correcting code. When that second content information is detected and the URD information on line 40 indicates "reliable" for the relevant bytes, switches 32 are set to the lower position, so that the entire information, including the sub-header symbols, is applied to the user device 36, which may also include the previously mentioned bus, and possibly also the previously mentioned random access memory. User device 36 may be a home computer, a professional file management system, a learning system, a game or the like, and because the specific user device characteristics do not form part of the invention they will not be elaborated upon further. There may also be present peripheral apparatus, for example, a video display element, an audio reproduction apparatus, a keyboard, a background memory printer, network connection and other customary peripheral apparatus. When the above selection is activated, detector 30 need not further detect the two contents or values of the sub-mode indication and decoding and supply of the data to user device 36 may continue in an undisturbed manner. If, however, the indication URD was "unreliable" during the first attempt, the detection operation in detector 30 will be repeated. Detection of the sub-header information (two contents of the sub-mode indication) may take place two or more times in succession, and when no decision can be made concerning the position of switches 32 after the last detection operation, an unreliability signal (URD) for the relevant sector is applied on line 42 to user device 36. The switch control signal on line 42, which indicates whether or not the error protection feature is present, is also sent to user device 36 so that user device 36 can know the length of the sector. This information may control, for example, a position of a memory address counter, and the control signal on line 42 can be a pulsed signal, a DC signal, or other representative signals.

When switches 32 are set to the upper position, the sector information is applied to third decoder 34, which implements the error protection and, if necessary and if possible, corrects errors. For this purpose use is also made of the unreliability signal URD. Finally, the restored user information, as restored by third decoder 34, is applied to user device 36. When switches 32 are in the lower position, the sector information is applied to user device 36 while bypassing decoder 34. At the end of the sector, switches 32 can always be set to the lower position so that the user device 36 can receive the header information of the next sector; the user device can use this header information as further control information, for example, for addressing a sector.

In an alternate embodiment, the foregoing can be modified such that in all situations in which it cannot be unambiguously detected that the further error protection is present, switches 32 will remain in the lower position so that, even if the error protection were present, all information will be supplied to the user device. On the basis of further information in the sub-header symbols, that is, the sub-mode indications, user device 36 will know which information is intended, because a selection takes place on the basis thereof during the execution of the user program. When the error protection is present in the sector, the relevant symbols will not be addressed. Thus, the only thing that can go wrong is that the error correction could be unduly omitted. Even though such omission may have serious consequences in given circumstances, such a situation is usually to be preferred over a complete absence of the sector information.

Figure 2:
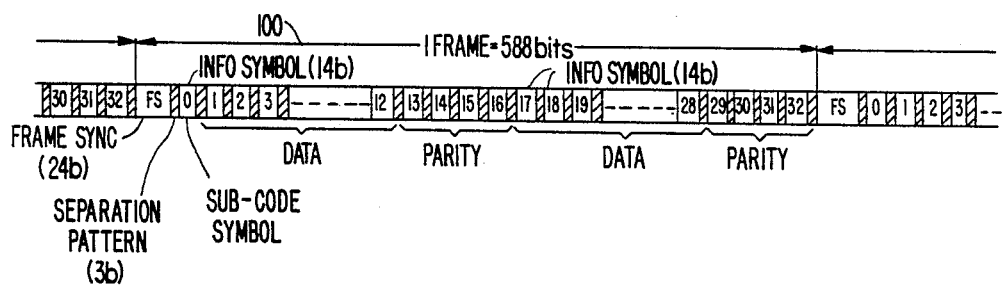
FIG. 2 is a diagrammatic representation of the lay-out of a frame, as stored on a storage medium according to the present invention.

FIG. 2 represents an example of the lay-out of a frame as arranged on the storage medium, in which the frame comprises 588 channel bits. A synchronization pattern FS comprises twenty-four channel bits, and the frame subsequently comprises thirty-three information symbols (0 ... 32) each of which comprises fourteen channel bits. Thirty-four separation patterns comprising three channel bits each, are cross-hatched in FIG. 2, separate the frame synchronization pattern and each of the information symbols. The information symbol 0 contains the so-called sub-code, which will be described hereinafter. The information symbols 1–12 and 17–28 contain data. The information symbols 13–16 and 29–32 contain redundancy bits for implementing two-symbol correcting codes, such as commonly used for the compact audio disc system. Upon demodulation, the separation patterns are removed and the fourteen remaining channel bits of each channel symbol are converted into eight code bits of a code symbol, and the synchronization pattern is ignored. After the two first decoders (24, 28), therefore, the following symbols remain in every storage frame: an 8-bit sub-code symbol and twenty-four data symbols. The channel symbols are redistributed over as many frames by descrambling, de-interleaving, and reconfiguration.

Figure 3:
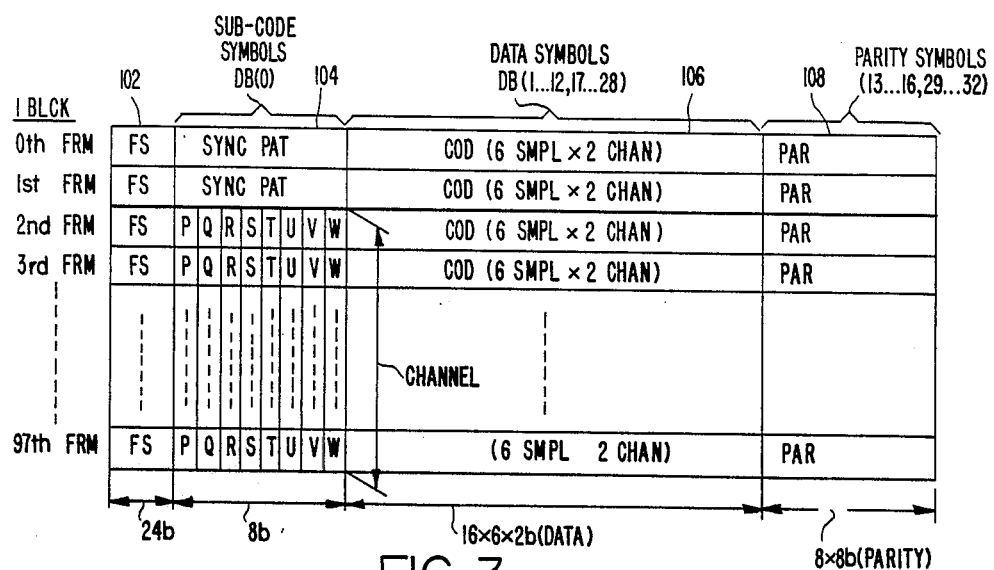
FIG. 3 is a diagrammatic representation of the lay-out of a number of frames, as in FIG. 2, arranged in a sector.

FIG. 3 shows the lay-out of ninety-eight successive frames as received from the storage medium. This number of frames corresponds to the magnitude of the sector, as will be seen from FIGS. 4A–4C below. Descrambling and the like have been ignored in this representation, and the separation patterns have also been omitted, thus, the situation shown arises after demodulation, and any signalling as an additional result of such demodulation has been omitted. This signalling could, for example, indicate the demodulation as being correct/incorrect on the basis of a channel symbol. The first column 102 of the block contains the ninety-eight frame synchronization patterns, the second column 104 of the block contains the ninety-eight sub-code symbols, the third column 106 of the block contains the ninety-eight times twenty-four (98×24) data symbols and column 108 contains the ninety-eight times eight (98×8) redundancy symbols.

The first two sub-code symbols (SYNC/PATTERN) of the block form a synchronization pattern that has a predetermined format, so that synchronization can be performed on the sub-code symbols. In the symbols of column 104 following the synchronization pattern, the P-bit forms a control bit, which is defined in the compact audio disc system and which discriminates between an audio signal and a pause interval, and the Q-bit is provided in order to realize a given degree of random accessibility to the audio frames. The first two bits in the Q-bit column are required for the synchronization pattern, the next four bits are control bits, and the next four bits are address bits. The last seventy-two bits in the Q-bit column are data bits, which can define a track number and an index code, and these may vary between decimal 00 and decimal 99. Furthermore, an absolute time may be specified in minutes, seconds, and frames, with a frame having a duration of 1/75 second. The last sixteen bits of the Q-bit column are available for an error detection code according to the CRC principle.

So far as they do not belong to the synchronization pattern, the columns R through W are reserved in the compact audio disc system for various applications that are irrelevant in this context and because the system in accordance with the invention must comply with the "CD audio standard", these bits can be ignored in this context.

Figure 4A:
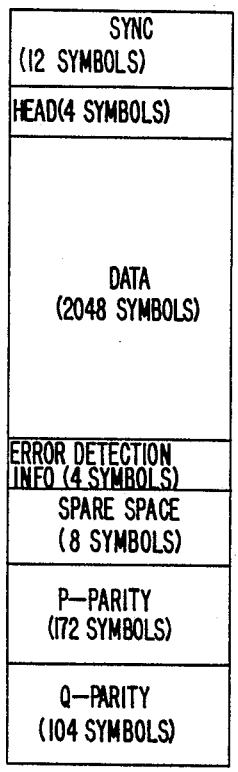
FIG. 4A is a diagrammatic representation of a previously proposed lay-out of a sector.
Figure 4B:
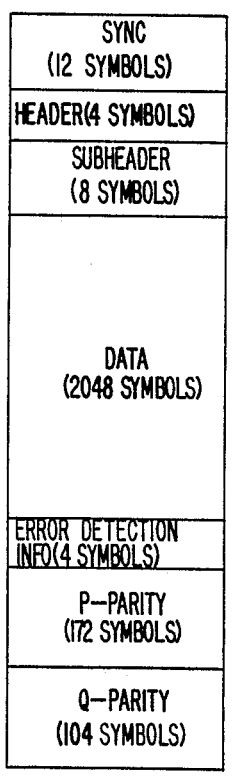
FIGS. 4B-4C are diagrammatic representations of the lay-out of sectors according to the present invention.
Figure 4C:
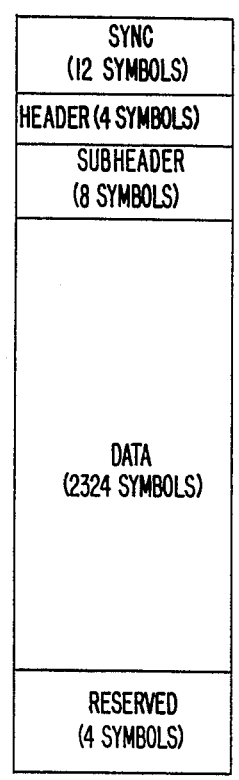

FIGS. 4A–4C represent various versions of the lay-out of a sector, which concerns only the information of the 24×98=2352 symbols of column 106 in FIG. 3. FIG. 4A shows the format taught in the above-identified patent application, in which the sector starts with synchronization information (SYNC) comprising twelve symbols. This information is followed by header information (HEAD) comprising four symbols. The first symbol contains a time indication in minutes that runs from 0 to a maximum of approximately 72 along the track of a disc, the second symbol contains a time indication in seconds, varying from 0 to 59, the third symbol contains a sector number, whereby the sectors are accessible for random addressing, and the fourth symbol contains a mode indication. Because this invention is intended to be compatible with the compact audio disc standards, for both hardware and software, the present system must not violate the compact disc-read only memory standard, but is provided as an extention thereto. Thus, a first value means skip this sector and indicates that the sector is "empty", a second value means error correction mandatory and indicates that the sector contains error protection, and a third value means choice postponed to subheader and indicates that the sector need not contain the additional error protection to be described hereinafter, however, such error protection may be present anyway. This postponement is the key to real-time format switching, because it was found that making the choice already in the header would not allow for real-time switching from one sector to the next one. Thus, this third case is the only one of importance in the following discussion. The header information (with the second value) is followed by user information, which comprises 2048 symbols, and which is followed by error protection information comprising four symbols and an open space covering eight symbols. The error detection information is based on the CRC principle and occupies all parts of the sector from the beginning up to an including this error detection information itself. Finally there is the redundancy of a pseudo-product code comprising 172 (P-PARITY) and 104 (Q-PARITY) symbols. The P-parity symbols are based on all of the sector from the header information up to and including an unused space (SPARE SPACE). The Q-parity symbols are also based on all parts of the sector from the header information up to and including the P-parity symbols. The fact that P-symbols and Q-symbols are based on different parts gives rise to the use of the word "pseudo". The error protection codes are known Reed-Solomon codes.

FIG. 4B illustrates a first solution in accordance with the present invention. The last header symbol now indicates the "third" value. The procedure illustrated in FIG. 4B is the same as that illustrated in FIG. 4A, in which the empty space of eight bytes has been converted into sub-header information (SUB/HEADER) and is moved forward in time, or upward in the present representations. In a preferred embodiment, this sub-header information consists of eight bytes, the first four bytes having exactly the same content as the last four bytes. More specifically, the first sub-header byte performs a selection between a number of different modes, such that in FIG. 4B it indicates that the error detection information (EDC) P-parity and Q-parity are present, so that a high degree of (additional) error protection is present. This first sub-header byte can also indicate whether the information concerns data, for example, software or audio information, which is thus additionally protected in the format of FIG. 4B, or video information. The second byte indicates different user modes for the information or indicates the quality of the information. The third and the fourth bytes may contain different information for making a selection from various sectors. The fifth up to and including the eighth byte repeat the information of the first four bytes. Consequently, a high degree of reliability is obtained, notably because this reliability can also be indicated by the URD information. If necessary, the most reliable version of the two versions can thus be selected.

FIG. 4C represents a second solution in accordance with the present invention, in which the error detection information (EDC) and the error correction information P-PAR/Q-PAR have now been omitted and their space is thus made available for data. Notably in the case of audio/video information storage (together with a substantial amount of additionally protected information on the disc), this additional storage space thus created is quite attractive. For example, the picture quality/picture frequency can be increased, or a longer sequence can be accommodated, or information associated with more-different scenes can be stored in parallel in a sector. Moreover, this omission of the additional error protection is signalled by the first and the fifth byte of the sub-header information. Due to the higher reliability thus obtained, this indication may differ between an arbitrary pair of sectors, as well as when these sectors are directly consecutive.

The above description is given on a single preferred embodiment of the invention, but it will be apparent that many modifications and variations could be effected by one skilled in the art without departing from the spirit or scope of the novel concepts of the invention, which should be determined by the appended claims.

What is claimed is:

1. In a method of storing digital information, which method includes the steps of:
    a. forming user symbols from the digital information;
    b. distributing the user symbols over a sequence of sectors, each sector being provided at its beginning with synchronization symbols;
    c. providing each sector with successive header symbols, user symbols and redundancy symbols of a first, systematic, symbol correcting code, which code includes the user symbols;
    d. distributing the symbols of a sector over a number of first frames, each of which contains a fixed, first number of symbols;
    e. adding second redundancy symbols of a second symbol correcting code to a first frame;
    f. interleaving the symbols from a sector and redundancy symbols of a first frame over a plurality of second frames equal to the number of symbols from the sector;
    g. adding third redundancy symbols of a third symbol correcting code to a second frame; and
    h. making the symbols originating from a first frame and third redundancy symbols bit-serially available for storage;
    the improvement comprising the steps of inserting between the header symbols and the user symbols in each sector a number of sub-header symbols, and coding said sub-header symbols to act as data symbols for said first, systematic, symbol correcting code, in which a first sub-mode indication value of said sub-header symbols indicates that said first symbol correcting code is active, and a second sub-mode indication value in a further sector indicates that said first symbol correcting code is not active and that the space of at least a part of said first redundancy symbols is occupied by additional user symbols.

2. A method as claimed in claim 1, characterized in that at least one of said header symbols contains a mode indication for indicating whether additional error protection by way of said first redundancy symbols is present in mandatory or non-mandatory manner.

3. A method as claimed in claim 1, characterized in that the number of sub-header symbols is an even number amounting to at least four, wherein symbols having a sub-mode indication value are separated from one another by at least one other symbol.

4. A method as claimed in claim 3, characterized in that said at least one other symbol is repeated as many times as the sub-mode indication value.

5. A method as claimed in claim 3, characterized in that said at least one other symbol indicates at least an encoding technique and a reliability level of the user information.

6. A method of reading digital information stored by means of the method claimed in claim 1, comprising the further steps of:
    a. bit-serially receiving code symbols from a storage medium and forming at least said third redundancy symbols therefrom;
    b. restoring the symbols of a second frame by means of the third redundancy symbols thereof;
    c. de-interleaving symbols of a second frame thus restored over as many first frames as the number of symbols of the second frame, each of which contains second redundancy symbols;
    d. restoring the symbols of a first frame by way of the second redundancy symbols thereof; and
    e. collecting said symbols of a first frame, so as to form a sector, having successive synchronization symbols, header symbols, and user symbols;
    improvement comprising the steps after the header symbols a number of sub-header symbols, and utilizing said sub-header symbols to act as data symbols for said first, systematic, symbol correcting code, and detecting a first sub-mode indication value thereof for indicating that said first symbol correcting code is active, after which the user symbols are restored in the sector by way of the first redundancy symbols, and upon failure to detect said first sub-mode indication value, undertaking again detection of said first sub-mode indication value, and upon repeated negative detection results of said first sub-mode indication value detecting a second sub-mode indication value indicating that a space of the first redundancy symbols in a sector is occupied by additional user symbols and that said restoring of the symbols of a first frame is omitted.

7. In apparatus for reading stored digital information, distributed as user symbols over a sequence of sectors, each sector being provided at its beginning with successive synchronization symbols and header symbols, in which a sector is provided at its end with first redundancy symbols of a first symbol correcting code which includes the user symbols and the symbols of a sector are distributed over a number of first frames, each of which contains a fixed, first number of symbols and second redundancy symbols of a second symbol correcting code are added to a first frame, the symbols originating from a sector are interleaved with second redundancy symbols of a first frame over a number of second frames, and third redundancy symbols of a third symbol correcting code are added to a second frame, the symbols originating from a first frame and third redundancy symbols being bit-serially available for storage and, in which between the header symbols and the user symbols in each sector there are inserted a number of sub-header symbols which act as data symbols for said first, systematic, symbol correcting code, a first sub-mode indication value indicating that said first symbol correcting code is active, a second sub-mode indication value in a further sector indicating that said first symbol correcting code is not active and that the space of at least a part of said first redundancy symbols is occupied by further user symbols,
    the reading apparatus for performing the above method, the improvement comprising a detector for said first and second sub-mode indication values, said detector also being responsive to a symbol-wise received reliability signal (URD) relating to said sub-mode symbols and a selector responsive to said detector for performing a selection between several, correspondingly detected, discrepant sub-mode symbols.

8. Apparatus according to claim 7, characterized in that said detector is responsive to several, respective contents of said sub-code symbols so as to apply associated control signals to a user device.

9. Apparatus according to claim 8, characterized in that said contents indicate that audio or video user information is contained in the relevant sector.

10. Apparatus according to claim 9, characterized in that said contents indicate a quality/user mode level of the user information in the relevant sector.

11. Apparatus according to claim 10, characterized in that said detector reacts by way of counting two successive, corresponding versions of the sub-header symbols.

* * * * *

UNITED STATES PATENT AND TRADEMARK OFFICE
CERTIFICATE OF CORRECTION

PATENT NO. : 4,802,169
DATED : January 31, 1989
INVENTOR(S) : Tadao Suzuki et al.

It is certified that error appears in the above-identified patent and that said Letters Patent is hereby corrected as shown below:

Column 7, line 18, before "and" insert --,--.

Column 9, line 2, after "more" delete "-".

IN CLAIMS

Column 10, line 20, before "improvement" insert --the--
    same line, after "steps" insert --of defining--.

Signed and Sealed this

Eighth Day of August, 1989

*Attest:*

DONALD J. QUIGG

*Attesting Officer*      *Commissioner of Patents and Trademarks*